United States Patent
Lee et al.

(10) Patent No.: US 11,799,089 B2
(45) Date of Patent: Oct. 24, 2023

(54) ELECTRODE FOR POLYMER ELECTROLYTE MEMBRANE FUEL CELL COMPRISING ANTIOXIDANT AND MEMBRANE-ELECTRODE ASSEMBLY COMPRISING SAME

(71) Applicant: KOREA INSTITUTE OF SCIENCE AND TECHNOLOGY, Seoul (KR)

(72) Inventors: So Young Lee, Seoul (KR); Seung Ju Lee, Seoul (KR); Jin Hyeon Choi, Seoul (KR); Jeawoo Jung, Seoul (KR); Hyoung-Juhn Kim, Seoul (KR); Sung Jong Yoo, Seoul (KR); Hee-Young Park, Seoul (KR); Bora Seo, Seoul (KR); Jin Young Kim, Seoul (KR); Jong Hyun Jang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 17/571,662

(22) Filed: Jan. 10, 2022

(65) Prior Publication Data

US 2023/0006216 A1    Jan. 5, 2023

(30) Foreign Application Priority Data

Jul. 5, 2021    (KR) ........................ 10-2021-0087754

(51) Int. Cl.
*H01M 4/86* (2006.01)
*H01M 8/1004* (2016.01)
(Continued)

(52) U.S. Cl.
CPC ....... *H01M 4/8663* (2013.01); *H01M 4/8605* (2013.01); *H01M 4/9041* (2013.01);
(Continued)

(58) Field of Classification Search
CPC ............ H01M 4/8663; H01M 4/8605; H01M 4/9041; H01M 4/9083; H01M 4/926;
(Continued)

(56) References Cited

U.S. PATENT DOCUMENTS

2022/0021015 A1* 1/2022 Lee .................. H01M 8/1023

FOREIGN PATENT DOCUMENTS

KR        10-2238598 B1    4/2021

OTHER PUBLICATIONS

Nano Fibrous Cerium (IV) Hydrogen Phosphate Membrane Self Supported Indole Polymerization Agent, J. Chem. Chem. Eng. 8(2014) 378-384 (Year: 2014).*

* cited by examiner

*Primary Examiner* — Stewart A Fraser
(74) *Attorney, Agent, or Firm* — Rabin & Berdo, P.C.

(57) ABSTRACT

The present disclosure relates to antioxidant for a polymer electrolyte membrane fuel cell electrode catalyst, which includes cerium hydrogen phosphate ($HCe_2(PO_4)_3(H_2O)$) in the form of a nanofiber, and an electrode and a membrane-electrode assembly including the same. The electrode for a polymer electrolyte membrane fuel cell of the present disclosure, wherein the antioxidant is dispersed, can improve the mechanical strength of an electrode catalyst layer and can minimize deterioration of chemical durability even after long-term operation. And, a fuel cell including the same can exhibit high output performance and can operate stably even after long-term operation.

9 Claims, 6 Drawing Sheets

(51) Int. Cl.
*H01M 4/90* (2006.01)
*H01M 4/92* (2006.01)
*H01M 8/1018* (2016.01)
*H01M 8/10* (2016.01)

(52) U.S. Cl.
CPC ......... *H01M 4/9083* (2013.01); *H01M 4/926* (2013.01); *H01M 8/1004* (2013.01); *H01M 8/1018* (2013.01); *H01M 2008/1095* (2013.01); *H01M 2300/0082* (2013.01)

(58) Field of Classification Search
CPC ............. H01M 8/1004; H01M 8/1018; H01M 2008/1095; H01M 2300/0082
See application file for complete search history.

ELECTRODE FOR POLYMER ELECTROLYTE MEMBRANE FUEL CELL COMPRISING ANTIOXIDANT AND MEMBRANE-ELECTRODE ASSEMBLY COMPRISING SAME

CROSS-REFERENCE TO RELATED APPLICATIONS

This application claims priority under 35 U.S.C. § 119 to Korean Patent Application No. 10-2021-0087754 filed on Jul. 5, 2021 in the Korean Intellectual Property Office, the disclosure of which is incorporated herein by reference in its entirety.

BACKGROUND

1. Field

The present disclosure relates to an electrode for a polymer electrolyte membrane fuel cell and a membrane-electrode assembly including the same, more particularly to an antioxidant for a polymer electrolyte membrane fuel cell electrode catalyst, an electrode for a polymer electrolyte membrane fuel cell including the antioxidant, and a membrane-electrode assembly including the electrode.

2. Description of the Related Art

Since a polymer electrolyte membrane fuel cell exhibits higher efficiency, higher current density and output density, shorter start-up time and faster responsiveness to load change when compared to other types of fuel cells, it can be applied to various applications including power sources of zero-emission vehicles, self-power generation, transportation, power supplies for military purposes, etc. For the polymer electrolyte membrane fuel cell to exhibit superior output performance, it should be able to operate stably in a wide range of current density.

In such a fuel cell system, a fuel cell stack, which actually generates electricity, has a structure in which several to tens of unit cells each consisting of a membrane-electrode assembly (MEA, also called an electrode-membrane assembly) and a separator (also called a bipolar plate) are stacked.

A cause of the deterioration of the durability of the membrane-electrode assembly is decomposition of the polymer electrolyte owing to chemical instability. The crossover of hydrogen and oxygen gases through the electrolyte membrane facilitates the production of hydrogen peroxide (HOOH). The hydrogen peroxide generates oxygen-containing radicals such as hydroxyl radical (OH), hydroperoxyl radical (OOH), etc. The produced radicals lower the durability of the fuel cell by attacking the functional groups ($-SO_3H$) of the perfluorosulfonate-based electrolyte membrane and thereby inducing chemical degradation of the membrane.

As another cause, during the process of directly transferring a catalyst layer onto the polymer electrolyte membrane, cracking of the catalyst layer may occur depending on the thickness of the catalyst layer, the content of a binder and the type of the catalyst. This eventually leads to the loss of the catalyst layer, and the presence of cracks in the catalyst layer causes the deterioration of performance and durability owing to the direct exposure of the polymer membrane to a gas supply channel.

Meanwhile, methods of adding various types of antioxidants to the electrolyte membrane or the electrode in order to mitigate the chemical degradation of the membrane-electrode assembly have been proposed. These antioxidants may be classified into primary antioxidants which are radical scavengers (or quenchers) and secondary antioxidants which are hydrogen peroxide decomposers. Representative primary antioxidants include cerium-based compounds, terephthalic acid, etc.

For improvement of the durability of the fuel cell membrane-electrode assembly, development of an electrode for a polymer electrolyte membrane fuel cell to which a different type of antioxidant has been added to ensure physical robustness and chemical stability and minimize deterioration of performance in spite of long-term operation, and a method for preparing a membrane-electrode assembly using the same is necessary.

REFERENCES OF THE RELATED ART

Patent Documents

Korean Patent No. 10-2238598

SUMMARY

The present disclosure is directed to providing an antioxidant for a polymer electrolyte membrane fuel cell electrode catalyst, which is formed of a solid acid that is stable even under strong acidity and can be prepared into a dispersion due to high dispersibility in the form of a nanofiber.

The present disclosure is also directed to providing an electrode for a polymer electrolyte membrane fuel cell, which can reinforce the mechanical strength of a catalyst layer and minimize the deterioration of chemical durability even after long-term operation, wherein the antioxidant is added to a catalyst slurry for a polymer electrolyte membrane fuel cell electrode.

The present disclosure is also directed to providing a polymer electrolyte membrane fuel cell, wherein a membrane-electrode assembly including an electrode including the antioxidant is introduced, which exhibits high output performance and can operate stably due to minimized decrease of performance even after long-term operation.

In an aspect, the present disclosure provides an antioxidant for a polymer electrolyte membrane fuel cell electrode catalyst, which contains cerium hydrogen phosphate ($HCe_2(PO_4)_3(H_2O)$) in the form of a nanofiber.

The antioxidant may be a radical scavenger.

The cerium hydrogen phosphate ($HCe_2(PO_4)_3(H_2O)$) may be a solid acid.

The nanofiber may have a diameter of 10-900 nm.

In another aspect, the present disclosure provides an electrode for a polymer electrolyte membrane fuel cell wherein the antioxidant for a polymer electrolyte membrane fuel cell electrode catalyst is dispersed.

The electrode may be based on one or metal selected from platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag) and copper (Cu).

The electrode may be one wherein the metal is supported on porous carbon.

The electrode may include a fluorine-based ionomer, a perfluorosulfonate-based ionomer and a hydrocarbon-based polymer ionomer.

The electrode for a polymer electrolyte membrane fuel cell may be used in a fuel cell including a polymer electrolyte based on a fluorine-based ionomer, a perfluorosulfonate-based ionomer or a hydrocarbon-based ionomer.

In another aspect, the present disclosure provides a method for preparing an electrode catalyst slurry for a polymer electrolyte membrane fuel cell, which includes:
- (a) a step of preparing a solution of cerium hydrogen phosphate ($HCe_2(PO_4)_3(H_2O)$) in the form of a nanofiber by reacting an acid solution in which a cerium (Ce) precursor is dissolved with a phosphoric acid ($H_3PO_4$) solution;
- (b) a step of preparing a first mixture solution by mixing the solution of cerium hydrogen phosphate ($HCe_2(PO_4)_3(H_2O)$) in the form of a nanofiber with an ionomer polymer solution;
- (c) a step of preparing a second mixture solution by mixing an electrode catalyst powder, distilled water and an alcohol solvent; and
- (d) a step of preparing an electrode catalyst slurry by mixing the first mixture solution and the second mixture solution.

In the step (a), the cerium (Ce) precursor may be any one selected from a sulfate, a nitrate and an ammonium nitrate salt of cerium (Ce).

In the step (a), the acid solution may be any one selected from an aqueous sulfuric acid solution, an aqueous nitric acid solution and an aqueous phosphoric acid solution.

In the step (b), the ionomer polymer may be any one selected from a fluorine-based ionomer, a perfluorosulfonate-based ionomer and a hydrocarbon-based polymer ionomer.

In the step (b), the concentration of the solution of cerium hydrogen phosphate ($HCe_2(PO_4)_3(H_2O)$) in the form of a nanofiber may be 0.5-2 wt % and the concentration of the ionomer polymer solution may be 1-45 wt %.

The first mixture solution may be a mixture of 1-10 parts by weight of the solution of cerium hydrogen phosphate ($HCe_2(PO_4)_3(H_2O)$) in the form of a nanofiber based on 100 parts by weight of the ionomer polymer solution.

In the step (c), the electrode catalyst powder may be a metal electrode material supported on porous carbon.

In the step (c), the alcohol solvent may be any one selected from methanol, ethanol, 1-propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethyl ethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol and 4-heptanol.

In the steps (b)-(d), the mixing may be performed by sonication.

In another aspect, the present disclosure provides a membrane-electrode assembly including: a polymer electrolyte membrane; and an electrode catalyst layer coated on the polymer electrolyte membrane, wherein the electrode catalyst layer has the antioxidant for a polymer electrolyte membrane fuel cell electrode catalyst dispersed.

The polymer electrolyte membrane may be based on any ionomer selected from a fluorine-based ionomer, a perfluorosulfonate-based ionomer and a hydrocarbon-based ionomer.

In another aspect, the present disclosure provides a polymer electrolyte membrane fuel cell including the membrane-electrode assembly.

In another aspect, the present disclosure provides a method for preparing a membrane-electrode assembly, which includes a step of transferring an electrode catalyst slurry for a polymer electrolyte membrane fuel cell prepared by the method described above onto a polymer electrolyte membrane.

The transfer may be performed by spray coating.

In another aspect, the present disclosure provides a device selected from a portable power supply, a mobile unit and a power device, which includes the polymer electrolyte membrane fuel cell.

In another aspect, the present disclosure provides a method for preparing a polymer electrolyte membrane fuel cell, which includes the method for preparing a membrane-electrode assembly.

The antioxidant for a polymer electrolyte membrane fuel cell electrode catalyst of the present disclosure may be formed of a solid acid material that is stable even under strong acidity and can be prepared into a dispersion due to high dispersibility in the form of a nanofiber.

The electrode for a polymer electrolyte membrane fuel cell of the present disclosure, wherein the antioxidant is dispersed, can improve the mechanical strength of an electrode catalyst layer and can minimize deterioration of chemical durability even after long-term operation.

The polymer electrolyte membrane fuel cell of the present disclosure, wherein a membrane-electrode assembly including the electrode including the antioxidant is introduced, exhibits high output performance and can operate stably due to minimized decrease of performance even after long-term operation.

DETAILED DESCRIPTION

Figure 1A:
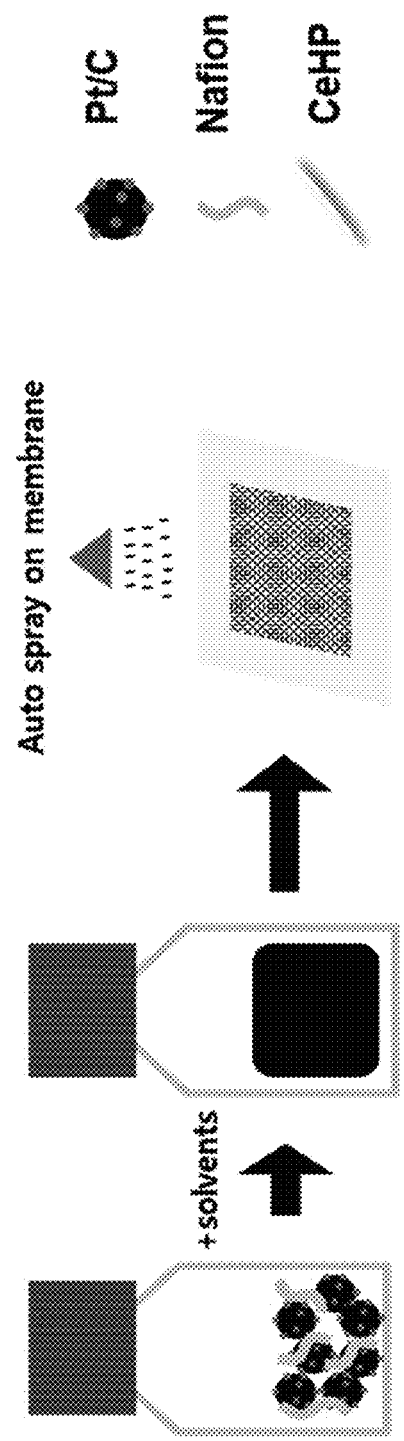
FIGS. 1A and 1B show a process of preparing a catalyst slurry and a membrane-electrode assembly according to an example and a comparative example.

The present disclosure can be changed variously and may have various exemplary embodiments. Hereinafter, specific exemplary embodiments will be described in detail referring to the attached drawings. However, the specific exemplary embodiments are not intended to limit the present disclosure and should be understood to include all changes, equivalents and substitutes included in the scope of the present disclosure. In the following description of the present disclosure, detailed description of known technologies may be omitted to avoid obscuring the subject matter of the present disclosure.

Hereinafter, an antioxidant for a polymer electrolyte membrane fuel cell electrode catalyst of the present disclosure is described.

The antioxidant for a polymer electrolyte membrane fuel cell electrode catalyst of the present disclosure may include cerium hydrogen phosphate ($HCe_2(PO_4)_3(H_2O)$) in the form of a nanofiber.

The antioxidant is a radical scavenger and acts as a primary antioxidant.

The crossover of hydrogen and oxygen gases through the electrolyte membrane facilitates the production of hydrogen peroxide (HOOH). The hydrogen peroxide generates oxygen-containing radicals such as hydroxyl radical (OH), hydroperoxyl radical (OOH), etc. The produced radicals lower the durability of the fuel cell by attacking the functional groups ($-SO_3H$) of the perfluorosulfonate-based electrolyte membrane and thereby inducing chemical degradation of the membrane. The antioxidant may prevent the damage of the electrolyte membrane by scavenging the radicals.

The cerium hydrogen phosphate ($HCe_2(PO_4)_3(H_2O)$) may be a solid acid. Accordingly, it may be stable even under a strongly acidic condition.

The nanofiber may have a diameter of 10-900 nm, more specifically 100-500 nm, further more specifically 150-350 nm. However, the diameter may be outside the above-described range as long as the nanofiber can be dispersed in an electrode catalyst slurry.

The present disclosure provides an electrode for a polymer electrolyte membrane fuel cell wherein the antioxidant for a polymer electrolyte membrane fuel cell electrode catalyst described above is dispersed.

The electrode may be an electrode catalyst based on one or metal selected from platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag) and copper (Cu). Specifically, it may be a platinum (Pt)-based electrode catalyst.

Specifically, the electrode may be one in which the metal is supported on porous carbon.

Specifically, the electrode may include a fluorine-based ionomer, a perfluorosulfonate-based ionomer and a hydrocarbon-based polymer ionomer. More specifically, it may include a perfluorosulfonate-based ionomer. When the existing cerium oxide antioxidant is added to an electrode catalyst slurry based on a perfluorosulfonate-based ionomer, proton conductivity may be decreased due to the reaction with the sulfonate group of the ionomer in the catalyst slurry, and a fuel cell using such an electrode may experience reduction in output. In contrast, the antioxidant of the present disclosure does not decrease proton conductivity and the reduction in output can also be prevented.

The electrode for a polymer electrolyte membrane fuel cell may be used in a fuel cell including a polymer electrolyte membrane based on any ionomer selected from a fluorine-based ionomer, a perfluorosulfonate-based ionomer and a hydrocarbon-based ionomer.

Hereinafter, a method for preparing an electrode catalyst slurry for a polymer electrolyte membrane fuel cell of the present disclosure will be described.

First, a solution of cerium hydrogen phosphate ($HCe_2(PO(H_2O))$) in the form of a nanofiber is prepared by reacting an acid solution in which a cerium (Ce) precursor is dissolved with a phosphoric acid ($H_3PO_4$) solution (step a).

The cerium (Ce) precursor may be specifically any one selected from a sulfate, a nitrate and an ammonium nitrate salt of cerium (Ce), more specifically a sulfate of cerium (Ce).

The acid solution may be specifically any one selected from an aqueous sulfuric acid solution, an aqueous nitric acid solution and an aqueous phosphoric acid solution, more specifically an aqueous sulfuric acid solution.

Then, a first mixture solution is prepared by mixing the solution of cerium hydrogen phosphate ($HCe_2(PO(H_2O))$) in the form of a nanofiber with an ionomer polymer solution (step b).

The ionomer polymer may be any one selected from a fluorine-based ionomer, a perfluorosulfonate-based ionomer and a hydrocarbon-based polymer ionomer. Specifically, it may be a fluorine-based ionomer polymer.

The concentration of the solution of cerium hydrogen phosphate ($HCe_2(PO_4)_3(H_2O)$) in the form of a nanofiber may be 0.5-2 wt %, and the concentration of the ionomer polymer solution may be 1-45 wt %. The concentration of the ionomer polymer solution may be specifically 2-20 wt %, more specifically 3-6 wt %.

With the above-described concentration ranges, the first mixture solution may be prepared by mixing specifically 1-10 parts by weight of the solution of cerium hydrogen phosphate ($HCe_2(PO_4)_3(H_2O)$) in the form of a nanofiber, more specifically 3-7 parts by weight of the solution of cerium hydrogen phosphate ($HCe_2(PO_4)_3(H_2O)$) in the form of a nanofiber, with 100 parts by weight of the ionomer polymer solution.

Then, a second mixture solution is prepared by mixing an electrode catalyst powder, distilled water and an alcohol solvent (step c).

Specifically, the electrode catalyst powder may be a metal electrode material supported on porous carbon, and the metal of the electrode material may be the same as that described above with regard to the electrode for a polymer electrolyte membrane fuel cell.

The alcohol solvent may be any one selected from methanol, ethanol, 1-propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethyl ethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol and 4-heptanol. Specifically, isopropyl alcohol (IPA) may be used.

Specifically, the mixing may be performed by sonication.

The sonication may be performed using any sonicator selected from a tip sonicator, an ultrasonic bath and a homogenizer.

Specifically, the second mixture solution may be prepared by mixing 1-5 parts by weight of distilled water and 10-50 parts by weight of the alcohol solvent with 100 parts by weight of the electrode catalyst powder. More specifically, 2-4 parts by weight of distilled water and 25-35 parts by weight of the alcohol solvent may be mixed with 100 parts by weight of the electrode catalyst powder.

Finally, an electrode catalyst slurry is prepared by mixing the first mixture solution and the second mixture solution (step d).

In the electrode catalyst slurry, the metal of the electrode catalyst, specifically platinum (Pt), may be loaded at a concentration of 0.1-1 wt %, more specifically 0.4-0.7 wt %, further more specifically 0.2-0.3 wt %.

The mixing may be performed by sonication and the sonicator described above may be used.

The present disclosure provides a membrane-electrode assembly including: a polymer electrolyte membrane; and an electrode catalyst layer coated on the polymer electrolyte membrane, wherein the electrode catalyst layer has the antioxidant for a polymer electrolyte membrane fuel cell electrode catalyst dispersed.

The polymer electrolyte membrane may be a polymer electrolyte membrane based on any ionomer selected from a fluorine-based ionomer, a perfluorosulfonate-based ionomer and a hydrocarbon-based ionomer, specifically a polymer electrolyte membrane based on a fluorine-based ionomer.

The polymer electrolyte membrane may be a single membrane or a composite membrane, specifically a fluorine-based, reinforced composite membrane.

The present disclosure provides any device selected from a portable power supply, a mobile unit and a power device, which includes the polymer electrolyte membrane fuel cell.

The present disclosure provides a polymer electrolyte membrane fuel cell including the membrane-electrode assembly.

The present disclosure provides a method for preparing a membrane-electrode assembly, which includes a step of transferring an electrode catalyst slurry for a polymer electrolyte membrane fuel cell prepared by the method described above onto a polymer electrolyte membrane.

Specifically, the transfer may be performed by spray coating. It may be performed by auto-spraying or hand spraying.

The present disclosure provides a method for preparing a polymer electrolyte membrane fuel cell, which includes the method for preparing a membrane-electrode assembly.

Although not described explicitly in the Examples section, electrode catalyst slurries and membrane-electrode assemblies were prepared by changing the cerium precursor and the acid solution in the step (a), the kind, content and mixing of the ionomer polymer solution in the step (b), the electrode catalyst and the alcohol solvent in the step (c), the mixing method in the step (d) and the type of the polymer electrolyte membrane in the methods for preparing an electrode catalyst slurry for a polymer electrolyte membrane fuel cell and a membrane-electrode assembly according to the present disclosure.

As a result, the output performance of the polymer electrolyte membrane fuel cell and the stability of performance after long-term operation were remarkable when all of the following conditions were satisfied:

In the step (a), the cerium precursor is a sulfate of cerium and the acid solution is sulfuric acid; in the step (b), the ionomer polymer solution is a Nafion ionomer solution and the concentration of the Nafion ionomer solution is 3-6 wt %; in the step (c), the electrode catalyst is Pt/C and the alcohol solvent is isopropyl alcohol (IPA); in the steps (b)-(d), the mixing is performed by sonication and the prepared electrode catalyst slurry is transferred onto a Nafion reinforced composite membrane.

Hereinafter, specific examples are presented to help the understanding of the present disclosure. However, the examples are provided for describing the present disclosure more specifically and it will be obvious to those having ordinary knowledge in the art that the scope of the present disclosure is not limited by them and various changes and modifications can be made within the scope of the present disclosure.

EXAMPLES

Figure 1B:
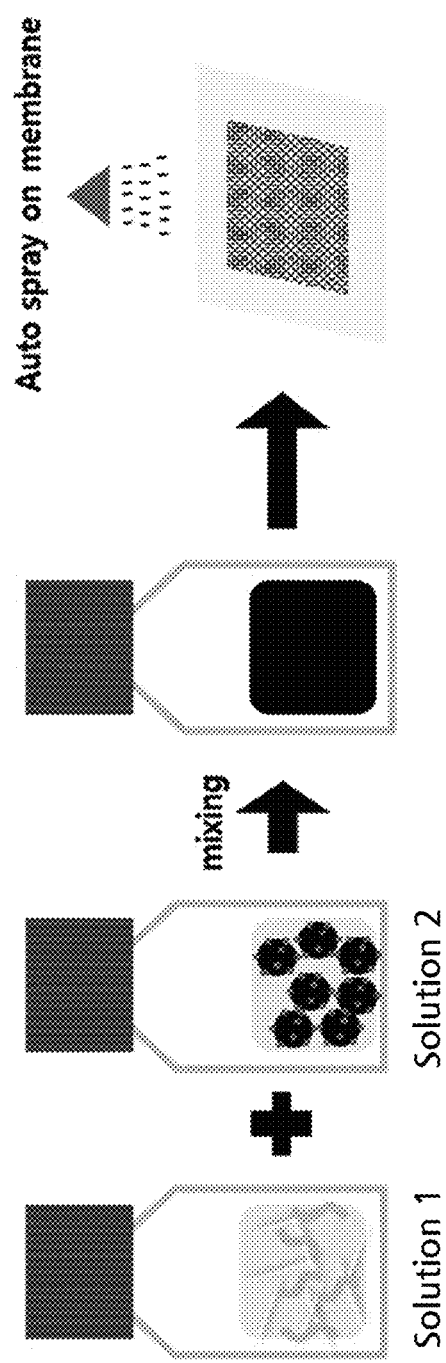

FIG. 1A schematically shows a process of preparing a catalyst slurry and a membrane-electrode assembly not including a cerium hydrogen phosphate ($HCe_2(PO_4)_3(H_2O)$) antioxidant in the form of a nanofiber, and FIG. 1B shows a process of preparing a catalyst slurry and a membrane-electrode assembly including a cerium hydrogen phosphate ($HCe_2(PO_4)_3(H_2O)$) antioxidant in the form of a nanofiber. Hereinafter, examples and comparative examples of the present disclosure will be described referring to FIGS. 1A and 1B.

Example 1: Preparation of Solution of Cerium Hydrogen Phosphate ($HCe_2(PO_4)_3(H_2O)$) Antioxidant in the Form of Nanofiber 20 mL of a 6 M $H_3PO_4$ solution was added in a dropwise manner to 20 mL of a 0.5 M $H_2SO_4$ solution in which 0.05 M $(CeSO_4)_2 \cdot 4H_2O$ was dissolved at 80° C. under stirring. The solution was digested while keeping temperature at 80° C. After adding 200 mL of warm distilled water at about 60° C., the mixture was stirred for 1 hour. Then, distilled water was added until the pH reached 3.

Example 2: Preparation of Catalyst Slurry

Solution 1 was prepared by mixing 475.2 mg of a 5 wt % Nafion ionomer (Sigma-Aldrich) solution with 24 mg of the 1 wt % $HCe_2(PO_4)_3(H_2O)$ solution prepared in Example 1, and solution 2 was prepared by mixing 64.24 mg of 46.5% Pt/C powder, 2 mL of distilled water and 20 mL of isopropyl alcohol (IPA) in a reactor. Each solution was dispersed for 30 minutes by using an ultrasonic bath. Then, after mixing the solutions 1 and 2, a catalyst slurry was prepared by dispersing with pulse 30 sec. on/10 sec. off for 10 minutes by tip sonication.

Example 3: Preparation of Electrode and Membrane-Electrode Assembly

An electrode was prepared by transferring the catalyst slurry prepared in Example 2 onto both sides of a Nafion 725 reinforced composite membrane (3M) to a Pt content of 0.2 mg/cm² by auto-spraying. Finally, a membrane-electrode assembly was prepared from the reinforced composite membrane onto which anode and cathode electrodes had been transferred together with a gasket.

Comparative Example 1: Preparation of Catalyst Slurry with No Antioxidant Added A mixture of 64.24 mg of 20% Pt/C powder, 2 mL of distilled water, 20 mL of isopropyl alcohol (IPA) and 482.5 mg of a 5% Nafion ionomer (Sigma-Aldrich) solution was dispersed in a reactor for 30 minutes by using an ultrasonic bath.

Comparative Example 2: Preparation of Electrode and Membrane-Electrode Assembly Using Catalyst Slurry with No Antioxidant Added An electrode and a membrane-electrode assembly were prepared under the same condition as Example 3, except that the catalyst slurry with no antioxidant added, prepared in Comparative Example 1, was used instead of that of Example 2.

Test Examples

Test Example 1: SEM Image and XRD Analysis of Antioxidant

Figure 2A:
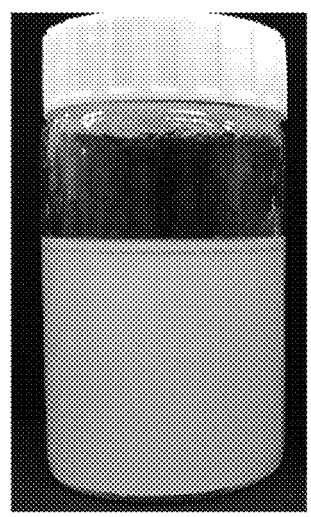
FIGS. 2A and 2B show a photographic image and an SEM image, respectively, obtained in Test Example 1.
Figure 2B:
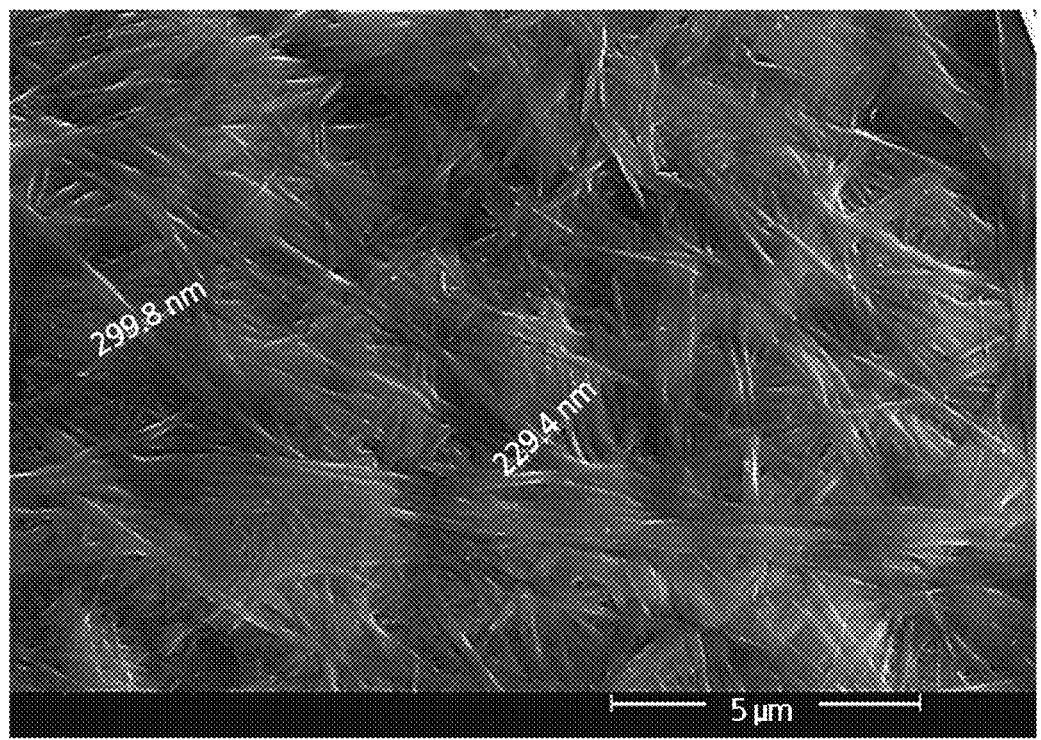

FIGS. 2A and 2B show a photographic image and an SEM image (scale bar=200 μm) of the cerium hydrogen phosphate ($HCe_2(PO_4)_3(H_2O)$) dispersion solution prepared in Example 1. It can be seen that nanofibers with a diameter of about 50-300 nm are formed.

Figure 3:
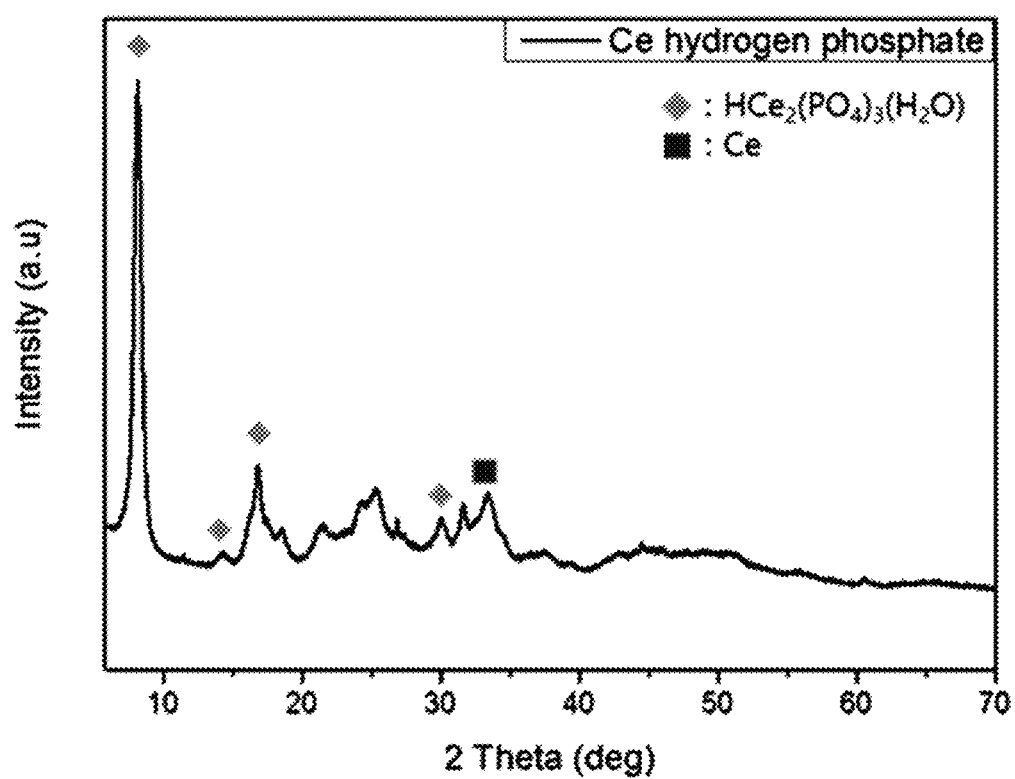
FIG. 3 shows a result of XRD analysis in Test Example 1.

FIG. 3 shows the XRD analysis result of the cerium hydrogen phosphate ($HCe_2(PO_4)_3(H_2O)$) prepared in Example 1. It can be seen that the largest 2-theta peak is observed at 8 degrees, which suggests that cerium hydrogen phosphate ($HCe_2(PO_4)_3(H_2O)$) with a crystal plane of [200] was synthesized. In addition, the presence of [110] and [400] plane peaks confirm the synthesis of cerium hydrogen phosphate ($HCe_2(PO_4)_3(H_2O)$).

Test Example 2: Evaluation of Durability of Membrane-Electrode Assembly

Figure 4A:
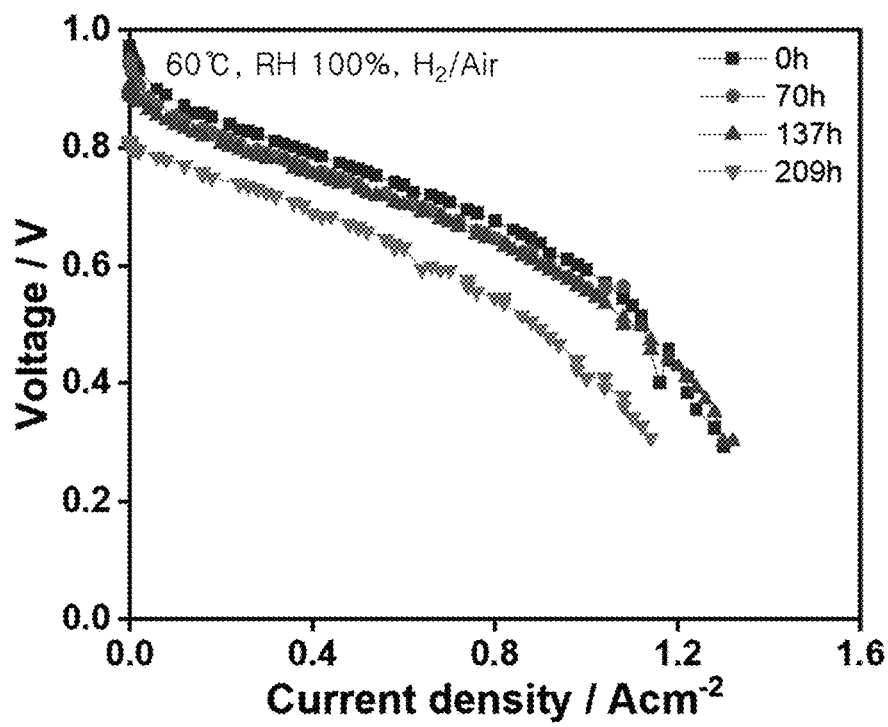
FIGS. 4A and 4B show the current-voltage curves of membrane-electrode assemblies obtained in Test Example 2.
Figure 4B:
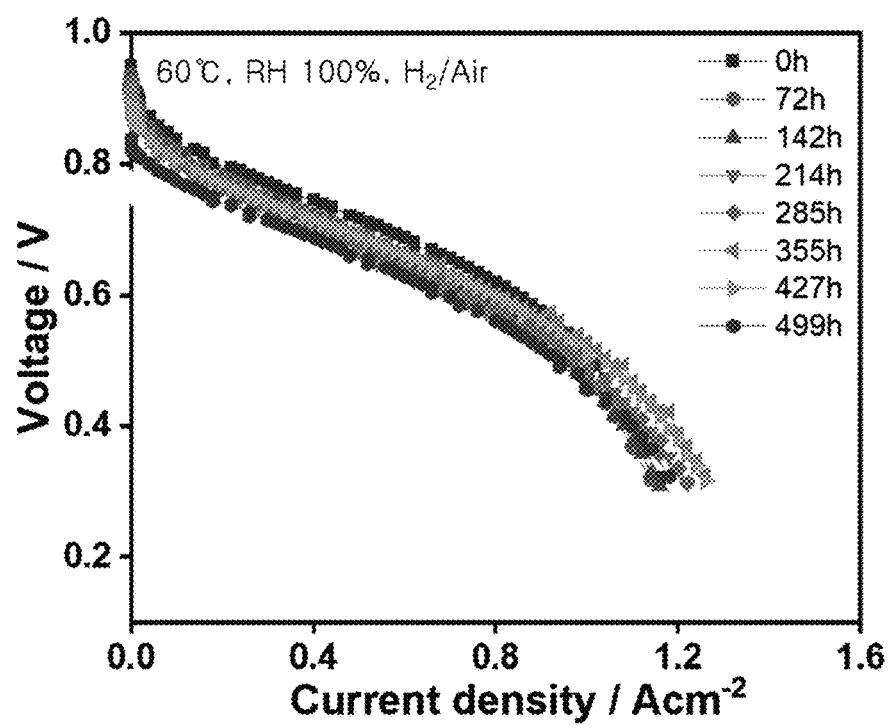

For measurement of the durability of the membrane-electrode assembly, current-voltage change was monitored under operation at 60 QC and relative humidity 100% under $H_2$/Air atmosphere. The result is shown in FIGS. 4A and 4B. FIG. 4A shows the current-voltage curve for the membrane-electrode assembly of Comparative Example 2, and FIG. 4B shows the current-voltage curve for the membrane-electrode assembly of Example 3.

Figure 5:
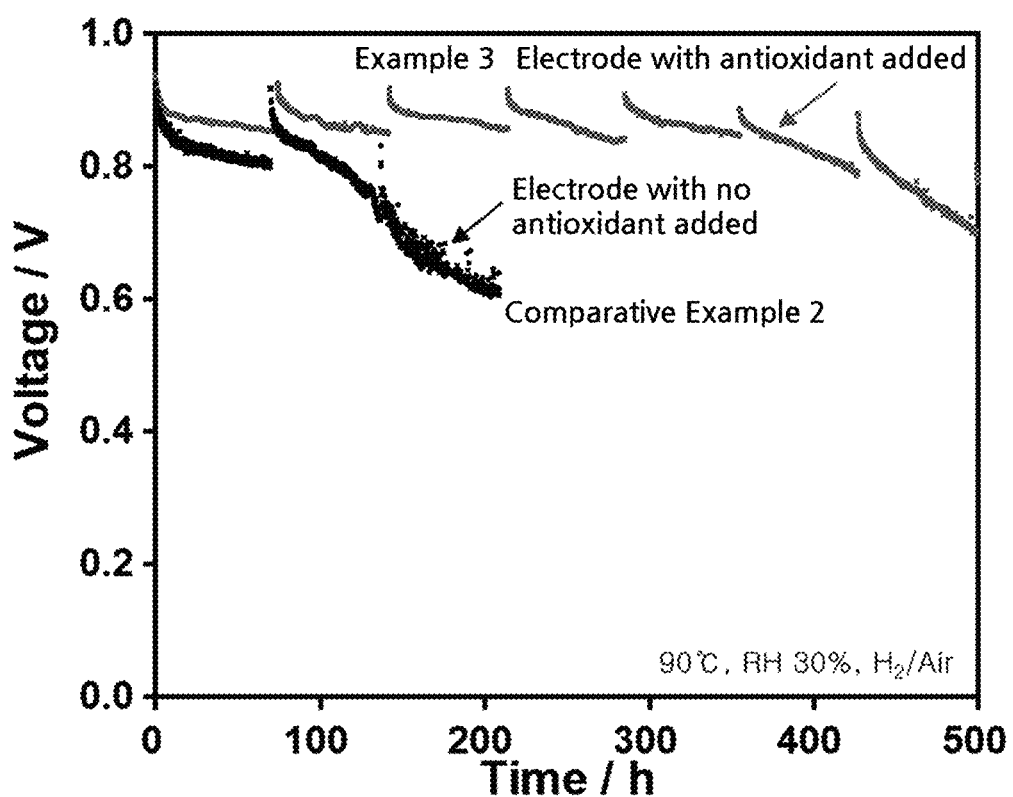
FIG. 5 shows the change in open-circuit voltage of membrane-electrode assemblies measured in Test Example 2.

It can be seen that the membrane-electrode assembly of Comparative Example 2 with no antioxidant added and the membrane-electrode assembly of Example 3 including the cerium hydrogen phosphate ($HCe_2(PO_4)_3(H_2O)$) antioxidant in the form of a nanofiber of the present disclosure did not show significant difference in initial performance. However, whereas the membrane-electrode assembly of Comparative Example 2 showed 19% decrease after 200 hours from the initial performance of 0.8 A cm$^{-2}$, the membrane-electrode assembly of Example 3 with the antioxidant added showed only 9.6% decrease from the initial performance even after 500 hours (2.5 times longer). Accordingly, it was confirmed that the membrane-electrode assembly including the cerium hydrogen phosphate ($HCe_2(PO_4)_3(H_2O)$) antioxidant in the form of a nanofiber of the present disclosure has remarkably improved durability as compared to that not including the antioxidant and, thus, the cell efficiency could be maintained even after long-term operation. The change in the open-circuit voltage of the membrane-electrode assemblies of Comparative Example 2 and Example 3 measured at 90° C. and relative humidity 30% under $H_2$/Air atmosphere depending on operation time is shown in FIG. 5.

It was confirmed the operation under relative humidity (30%) condition that, whereas the open-circuit voltage (OCV) performance was decreased to 0.6 V after 200 hours of operation for the membrane-electrode assembly of Comparative Example 2 with no antioxidant added, the open-circuit voltage (OCV) performance was decreased to 0.7 V after 500 hours (2.5 times longer than that of the membrane-electrode assembly of Comparative Example 2) of operation for the membrane-electrode assembly of Example 3 with the antioxidant added.

Although specific exemplary embodiments of the present disclosure have been described, those having ordinary knowledge in the art will understand that the present disclosure can be changed and modified variously through additions, changes, deletions substitutions, etc. without departing from the spirit of the present disclosure and such changes and modifications are also included in the scope of the present disclosure.

What is claimed is:

1. An antioxidant for a polymer electrolyte membrane fuel cell electrode catalyst, comprising a hydrate of a compound containing cerium hydrogen phosphate ($HCe_2(PO_4)_3(H_2O)$) in the form of a nanofiber.

2. The antioxidant for a polymer electrolyte membrane fuel cell electrode catalyst according to claim 1, wherein the antioxidant is a radical scavenger.

3. The antioxidant for a polymer electrolyte membrane fuel cell electrode catalyst according to claim 1, wherein the hydrate of a compound containing cerium hydrogen phosphate ($HCe_2(PO_4)_3(H_2O)$) is a solid acid.

4. The antioxidant for a polymer electrolyte membrane fuel cell electrode catalyst according to claim 1, wherein the nanofiber has a diameter of 10-900 nm.

5. An electrode for a polymer electrolyte membrane fuel cell wherein the antioxidant for a polymer electrolyte membrane fuel cell electrode catalyst according to claim 1 is dispersed.

6. The electrode for a polymer electrolyte membrane fuel cell according to claim 5, wherein the electrode is based on one or metal selected from platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag) and copper (Cu).

7. The electrode for a polymer electrolyte membrane fuel cell according to claim 5, wherein the electrode is one wherein the metal is supported on porous carbon.

8. The electrode for a polymer electrolyte membrane fuel cell according to claim 5, wherein the electrode comprises a fluorine-based ionomer, a perfluorosulfonate-based ionomer and a hydrocarbon-based polymer ionomer.

9. The electrode for a polymer electrolyte membrane fuel cell according to claim 5, wherein the electrode for a polymer electrolyte membrane fuel cell is used in a fuel cell comprising any one selected from a polymer electrolyte based on a fluorine-based ionomer, a perfluorosulfonate-based ionomer and a hydrocarbon-based ionomer.

* * * * *